United States Patent
Liu et al.

(10) Patent No.: US 12,301,357 B2
(45) Date of Patent: May 13, 2025

(54) UPLINK PACKET DUPLICATION TRANSMISSIONS

(71) Applicant: ZTE CORPORATION, Guangdong (CN)

(72) Inventors: Zhuang Liu, Shenzhen (CN); Yin Gao, Shenzhen (CN); Zijiang Ma, Shenzhen (CN)

(73) Assignee: ZTE Corporation, Shenzhen (CN)

(*) Notice: Subject to any disclaimer, the term of this patent is extended or adjusted under 35 U.S.C. 154(b) by 286 days.

(21) Appl. No.: 17/844,353

(22) Filed: Jun. 20, 2022

(65) Prior Publication Data

US 2023/0067164 A1    Mar. 2, 2023

Related U.S. Application Data

(63) Continuation of application No. PCT/CN2020/090974, filed on May 19, 2020.

(51) Int. Cl.
| | |
|---|---|
| *H04L 1/08* | (2006.01) |
| *H04L 45/24* | (2022.01) |
| *H04W 72/21* | (2023.01) |
| *H04W 76/15* | (2018.01) |

(52) U.S. Cl.
CPC ............ *H04L 1/08* (2013.01); *H04L 45/24* (2013.01); *H04W 72/21* (2023.01); *H04W 76/15* (2018.02)

(58) Field of Classification Search
CPC .......... H04L 1/08; H04L 45/24; H04W 72/21; H04W 76/15
See application file for complete search history.

(56) References Cited

U.S. PATENT DOCUMENTS

| | | | |
|---|---|---|---|
| 2018/0368107 A1 | 12/2018 | Babaei et al. | |
| 2019/0174342 A1 | 6/2019 | Yokoyama et al. | |
| 2019/0215719 A1 | 7/2019 | Wei et al. | |
| 2019/0253926 A1* | 8/2019 | Kim | H04L 1/08 |
| 2019/0254117 A1 | 8/2019 | Chen et al. | |
| 2020/0015302 A1* | 1/2020 | Shikari | H04L 43/0876 |
| 2020/0229258 A1 | 7/2020 | Wang et al. | |
| 2020/0267794 A1* | 8/2020 | Baek | H04W 76/27 |

FOREIGN PATENT DOCUMENTS

| | | |
|---|---|---|
| CN | 101729396 A | 6/2010 |
| CN | 102158303 A | 8/2011 |
| CN | 109150388 A | 1/2019 |

(Continued)

OTHER PUBLICATIONS

International Search Report and Written Opinion for PCT Appl. No. PCT/CN2020/090974 mailed Dec. 30, 2020 (7 pages).

(Continued)

*Primary Examiner* — Kevin C. Harper
*Assistant Examiner* — Jia Hao Deng
(74) *Attorney, Agent, or Firm* — Foley & Lardner LLP

(57) ABSTRACT

Presented are a systems, methods, apparatuses, or a computer-readable media for uplink packet duplication transmission. A host radio access network (RAN) node hosting a packet data convergence protocol (PDCP) entity may determine a location of a primary radio link control (RLC) entity. The host RAN node may transmit, to an assisting RAN node, the location of the primary RLC entity.

16 Claims, 13 Drawing Sheets

(56) References Cited

FOREIGN PATENT DOCUMENTS

| CN | 110139397 A | 8/2019 |
| CN | 110431876 A | 11/2019 |
| JP | 2020-511818 A | 4/2020 |
| KR | 1020200049904 A | 5/2020 |
| WO | WO-2018/203622 A1 | 11/2018 |
| WO | WO-2019/029824 A1 | 2/2019 |
| WO | WO-2020/060141 A1 | 3/2020 |

OTHER PUBLICATIONS

Extended European Search Report on EP Appl No. 20897308.1, dated Jun. 23, 2023 (9 pages).
First Office Action for TW Appl. No. 110112440, dated Apr. 18, 2024 (7 pages).
First Office Action for CN Appl. No. 202080084982.0, dated Nov. 22, 2024 (with English translation, 17 pages).
ZtTE, "Consideration on PDCP UL duplication coordination for more than 2 RLC entities", 3GPP TSG RAN WG3 #107-e, R3-200259, Mar. 6, 2020, E-Meeting (4 pages).

\* cited by examiner

UPLINK PACKET DUPLICATION TRANSMISSIONS

CROSS-REFERENCE TO RELATED APPLICATION

This application claims the benefit of priority under 35 U.S.C. § 120 as a continuation of PCT Patent Application No. PCT/CN2020/090974, filed on May 19, 2020, the disclosure of which is incorporated herein by reference in its entirety.

TECHNICAL FIELD

The disclosure relates generally to wireless communications, including but not limited to systems and methods for uplink packet duplication transmissions.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A host radio access network (RAN) node hosting a packet data convergence protocol (PDCP) entity may determine a location of a primary radio link control (RLC) entity. The host RAN node may transmit, to an assisting RAN node, the location of the primary RLC entity.

In some embodiments, the host RAN node may determine an initial state of uplink duplication of at least one secondary RLC entity at the assisting RAN node. In some embodiments, the host RAN node may transmit, to the assisting RAN node, the initial state of uplink duplication of the at least one secondary RLC entity at the assisting RAN node. In some embodiments, the host RAN node may determine an initial state of uplink duplication of all secondary nodes including the at least one secondary RLC entity at the assisting RAN node.

In some embodiments, the assisting node may be caused to store the initial state of uplink duplication of the at least one secondary RLC entity at the assisting RAN node, when the location of the primary RLC entity is not at the assisting node. In some embodiments, the assisting node may be caused to store the initial state of uplink duplication of the at least one secondary RLC entity at the assisting RAN node, except that of the primary RLC entity, when the location of the primary RLC entity is at the assisting node. In some embodiments, the host RAN node may transmit, directly or via the assisting node, to a wireless communication device, via a radio resource control (RRC) message, the initial state of uplink duplication of the at least one RLC entity at the assisting RAN node, and an initial state of uplink duplication of at least one secondary RLC entity at the host RAN node.

In some embodiments, the host RAN node may determine an initial state of uplink duplication of at least one secondary RLC entity at another assisting RAN node. In some embodiments, the host RAN node may transmit, to the another assisting RAN node, the initial state of uplink duplication of the at least one secondary RLC entity at the another assisting RAN node.

In some embodiments, the host RAN node may determine an initial state of uplink duplication of at least one secondary RLC entity at the host RAN node. In some embodiments, the host RAN node may determine a number of secondary RLC entities to be activated at the assisting RAN node. In some embodiments, the host RAN node may transmit, to the assisting RAN node, the number of secondary RLC entities to be activated at the assisting RAN node.

In some embodiments, the assisting RAN node may be caused to determine an initial state of uplink duplication of at least one secondary RLC entity at the assisting RAN node, according to the location of the primary RLC entity and the number of secondary RLC entities to be activated at the assisting RAN node. In some embodiments, the host RAN node may receive, from the assisting RAN node, the initial state of uplink duplication of at least one secondary RLC entity at the assisting RAN node. In some embodiments, the host RAN node may transmit, directly or via the assisting node, to a wireless communication device, via a radio resource control (RRC) message, the initial state of uplink duplication of at least one RLC entity at the assisting RAN node, and the initial state of uplink duplication of at least one secondary RLC entity at the host RAN node.

In some embodiments, the host RAN node may include a master node (MN), and the assisting RAN node may include a secondary node (SN). In some embodiments, the host RAN node may include a secondary node (SN), and the assisting RAN node may include a master node (MN). In some embodiments, the host RAN node may include a centralized unit (CU), and the assisting RAN node may include a distributed unit (DU).

At least one aspect is directed to a system, method, apparatus, or a computer-readable medium. An assisting radio access network (RAN) node may receive, from a host RAN node hosting a packet data convergence protocol (PDCP) entity, a location of a primary radio link control (RLC) entity. In some embodiments, the assisting RAN node may receive, from the host RAN node, an initial state of uplink duplication of the at least one secondary RLC entity at the assisting RAN node.

In some embodiments, the assisting node may store the initial state of uplink duplication of the at least one secondary RLC entity at the assisting RAN node, when the location of the primary RLC entity is not at the assisting node. In some embodiments, the assisting node may store the initial state of uplink duplication of the at least one secondary RLC entity at the assisting RAN node, except that of the primary RLC entity, when the location of the primary RLC entity is at the assisting node. In some embodiments, the initial state of uplink duplication of the at least one RLC entity at the assisting RAN node, and an initial state of uplink duplication of at least one secondary RLC entity at the host RAN node may be transmitted via a radio resource control (RRC) message to a wireless communication device.

In some embodiments, the assisting RAN node may receive, from the host RAN node, a number of secondary RLC entities to be activated at the assisting RAN node. In some embodiments, the assisting RAN node may determine an initial state of uplink duplication of at least one secondary RLC entity at the assisting RAN node, according to a location of the primary RLC entity and the number of secondary RLC entities to be activated at the assisting RAN node. In some embodiments, the assisting RAN node may transmit, to the host RAN node, the initial state of uplink duplication of at least one secondary RLC entity at the assisting RAN node. In some embodiments, the initial state of uplink duplication of at least one RLC entity at the assisting RAN node, and the initial state of uplink duplication of at least one secondary RLC entity at the host RAN node may be transmitted to a wireless communication device via a radio resource control (RRC) message.

In some embodiments, the host RAN node may include a master node (MN), and the assisting RAN node may include a secondary node (SN). In some embodiments, the host RAN node may include a secondary node (SN), and the assisting RAN node may include a master node (MN). In some embodiments, the host RAN node may include a centralized unit (CU), and the assisting RAN node may include a distributed unit (DU).

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| AF | Application Function |
| CA | Carrier Aggregation |
| CU | Central Unit |
| DC | Dual Connectivity |
| DCI | Downlink Control Information |
| DL | Down Link or Downlink |
| DN | Data Network |
| DRB | Dedicated Radio Bearer |
| FR | Frequency Range |
| LCH | Logical Channel |
| MAC | Medium Access Control |
| MAC-CE | Medium Access Control (MAC) Control Element (CE) |
| MCG | Master Cell Group |
| MN | Master Node |

-continued

| Acronym | Full Name |
|---|---|
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PUCCH | Physical uplink control channel |
| QCL | Quasi-Co-Location |
| QoS | Quality of Service |
| RAN | Radio Access Network |
| RE | Resource Element |
| REC | Radio Link Control |
| RS | Reference Signal |
| RRC | Radio Resource Control |
| SCG | Secondary Cell Group |
| SN | Secondary Node |
| SSB | Synchronization Signal Block |
| SRS | Sounding Reference Signal |
| TC | Transmission Configuration |
| TCI | Transmission Configuration Indicator |
| TRS | Tracking Reference Signal |
| UE | User Equipment |
| UL | Up Link or Uplink |
| uRLLC | Ultra-Reliable Low Latency Communications |

1. Mobile Communication Technology and Environment

Figure 1:
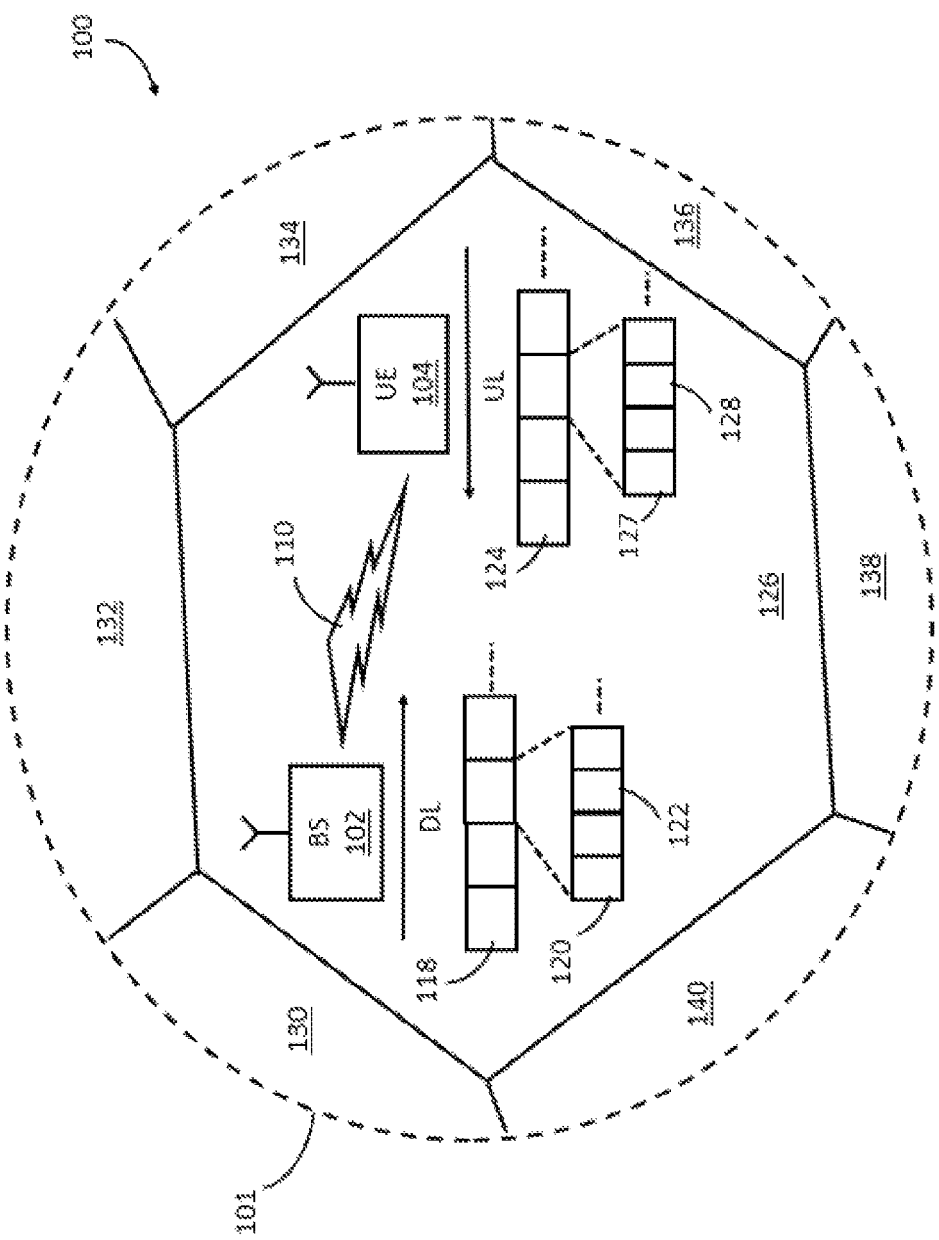
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
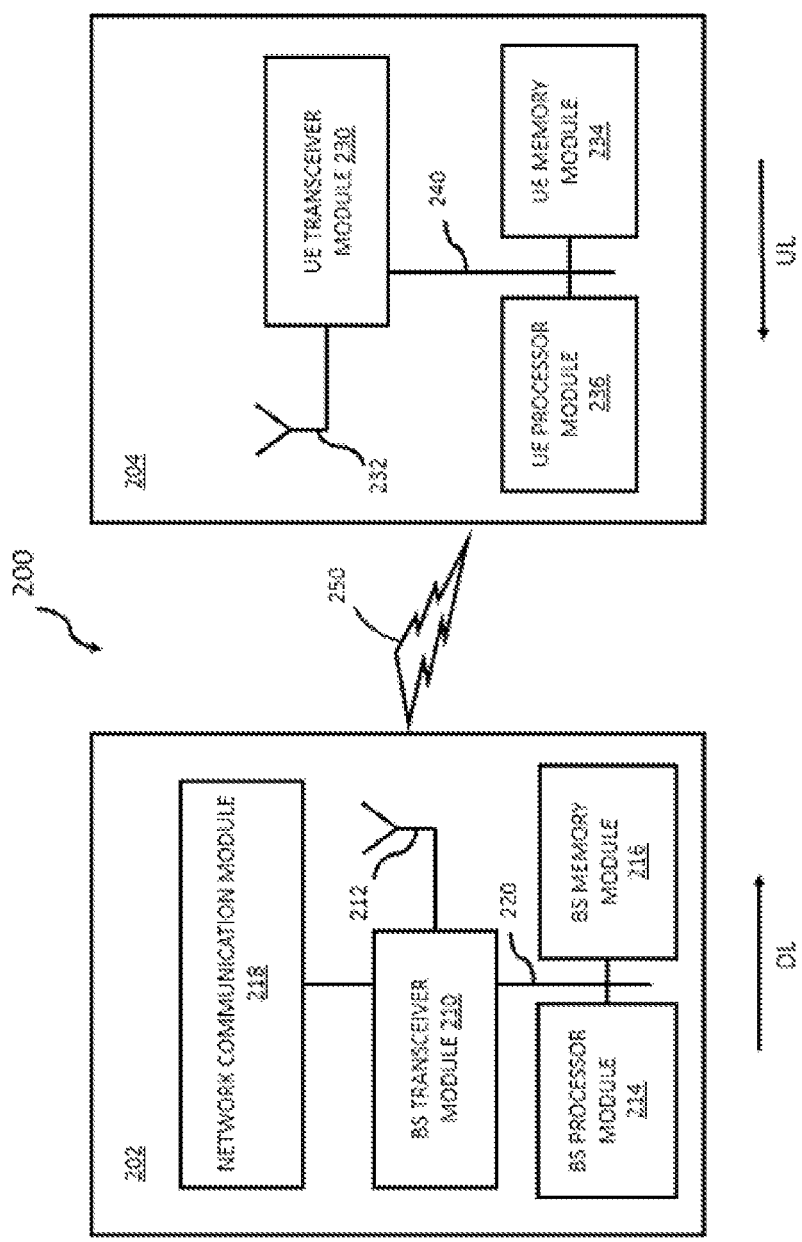
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Uplink Packet Duplication Transmission

To ensure ultra-reliable low latency communications (uRLLC) over 5G wireless network, packet duplication functionality at the packet data convergence protocol (PDCP) layer may be introduced in 5G. When duplication is configured for a dedicated radio bearer (DRB) with more than two radio link control (RLC) entities associated with the PDCP entity, the radio resource control (RRC) may inform the initial state of UL PDCP duplication (either activated or deactivated for per RLC entity) to a user equipment (UE). The transmitting PDCP entity at UE side can duplicate the PDCP protocol data unit (PDU) and submit the copy to each activated RLC entity indicated by the initial state information as soon as the DRB setup. However, without coordination between radio access network (RAN) nodes, the RAN network cannot configure initial state of UL PDCP duplication for each RLC entity for user equipment (UE). This may be because the RLC entities associated with the PDCP entity may be located at different RAN node, such as at a master node (MN) or a secondary node (SN) in the case of dual connectivity (DC) split bearer, or at different a distributed unit (DU) in the case of a CU-DU split architecture.

Figure 3:
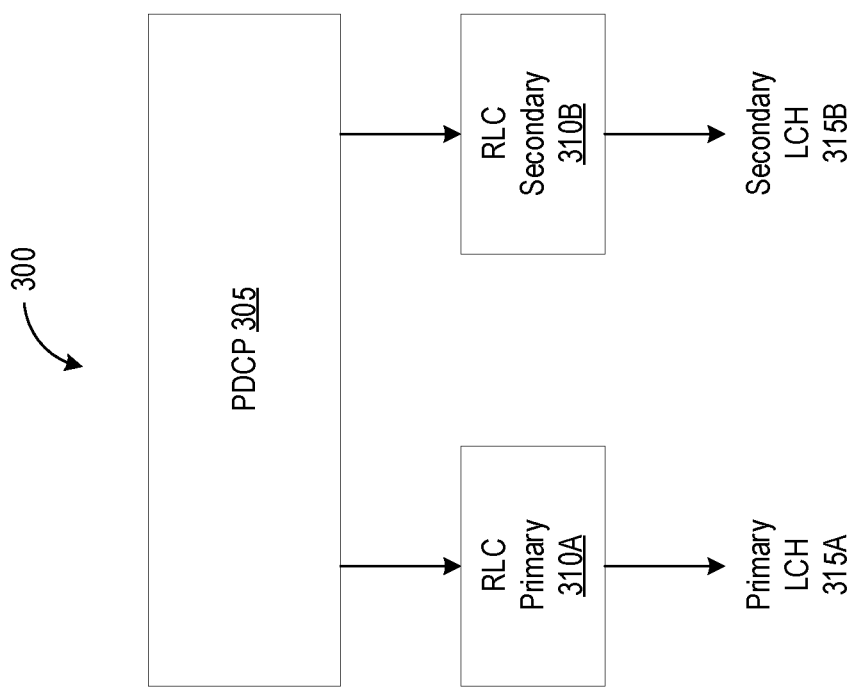
FIG. 3 illustrates a block diagram of R15 packet data convergence protocol (PDCP) duplication with two radio link control (RLC) entities.

In 3GPP release 15, the PDCP duplication activation or deactivation may be configured per DRB. Referring now to FIG. 3, depicted is a block diagram of a system 300 for uplink packet duplication transmission. The system 300 may include a node (e.g., the RAN node) hosting PDCP 305. When a DRB that is configured with UL PDCP duplication is added to a UE, the UE will establish two RLC entities in order to support the UL PDCP duplication, one RLC entity is primary RLC entity, and the other RLC entity is secondary RLC entity. The logical channel corresponding to the primary RLC entity 310A may be referred to as the primary logical channel 315A, and the logical channel corresponding to the secondary RLC entity 310B may be the secondary logical channel 315B.

Since the PDCP duplication activation or deactivation is configured for per DRB in R15, the RAN node hosting PDCP entity can directly sign the initial state of the UL PDCP duplication for this established DRB to UE through RRC message. As such, no coordination between RAN nodes may be involved. If the initial state of the UL PDCP duplication is activated for the DRB, the PDCP entity in UE may duplicate PDCP PDU and submit the duplicated PDUs to both RLC entities for initial data transmission. Otherwise, If the initial state of the UL PDCP duplication for the DRB is deactivated, the PDCP entity in UE may submit the PDCP PDU to the primary RLC entity.

Figure 4:
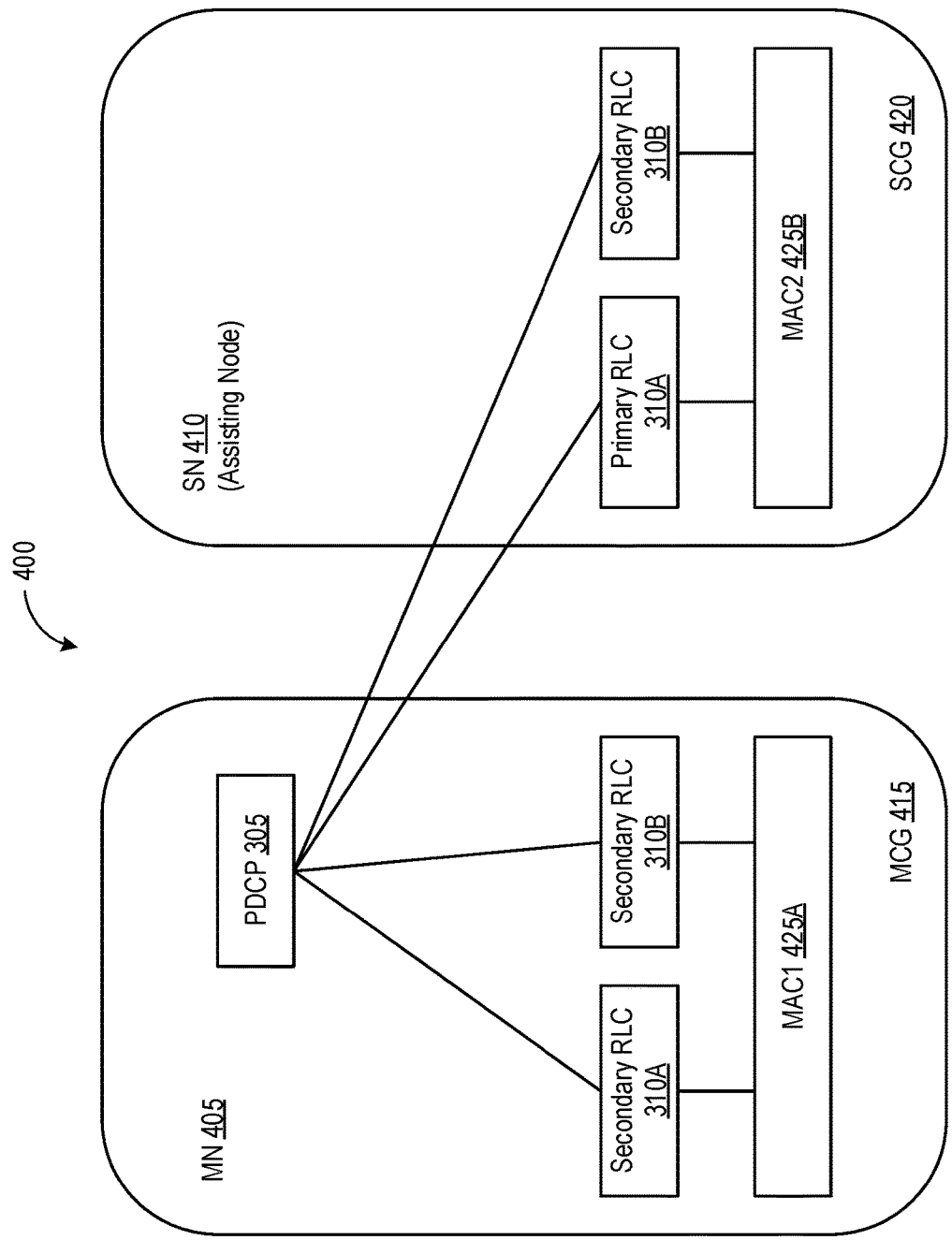
FIG. 4 illustrates a block diagram of PDCP duplication with more than one secondary LC entities (e.g., a master node (MN) terminated split bearer)
Figure 5:
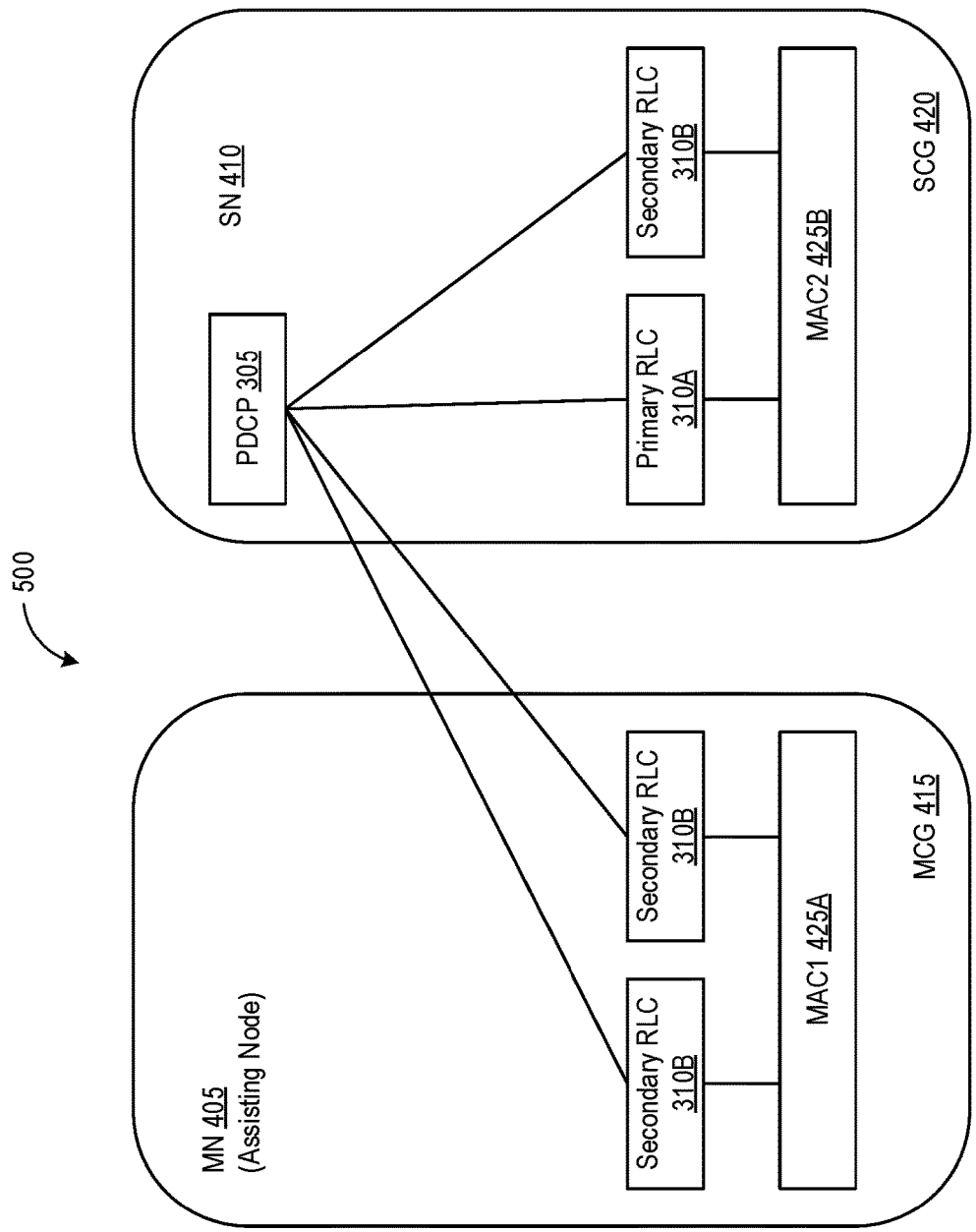
FIG. 5 illustrates a block diagram of PDCP duplication with more than one secondary RLC entities (e.g., a secondary node (SN) terminated split bearer)
Figure 6:
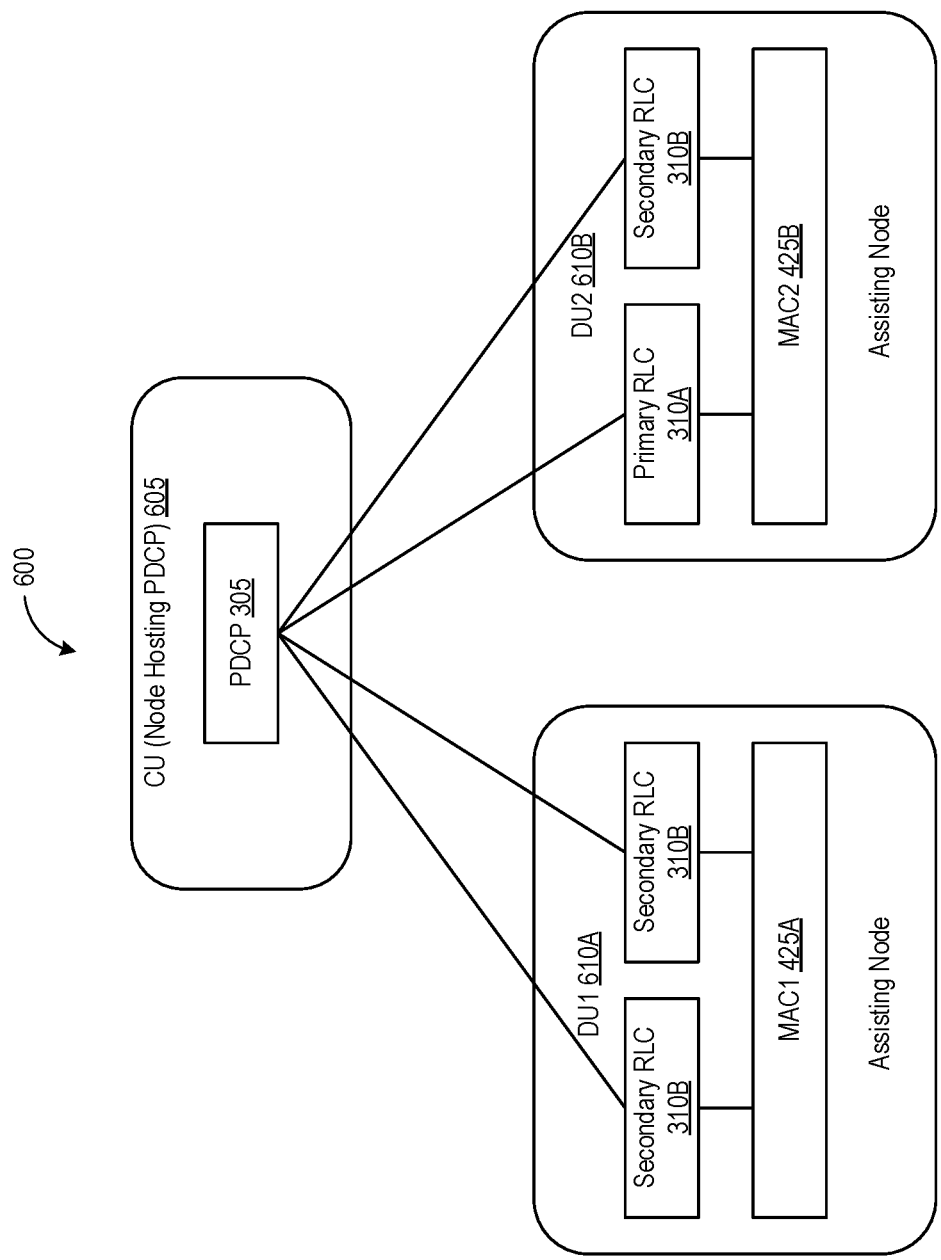
FIG. 6 illustrates a block diagram of PDCP duplication with more than one secondary RLC entities (CU-DU split gNB)

In 3GPP release 16, the PDCP duplication may support more than two RLC entities. Where there are one primary RLC entity and more than one secondary RLC entities 310B, the PDCP duplication activation/deactivation may be configured for per RLC entity 310A and 310B. The primary RLC entity 310A may be always activated. However, without coordination between RAN nodes, the RAN network cannot configure initial state of UL PDCP duplication for each RLC entity for UE. This may be because the RLC entities associated with the PDCP entity are located at different RAN node For example, at MN 405 in a MCG 415 and SN 410 in a SCG 420 in the case of DC split bearer (as shown in system 400 depicted in FIG. 4 and system 500 in FIG. 5), or at different DU 610A and 610B communicatively coupled with a CU 605 hosting the PCDP in the case of CU DU split architecture (as shown in system 600 of FIG. 6). In the examples, the logical channels may be supported via MAC1 425A and MAC2 425B.

There may be two solution to solve how to configure the initial state of UL duplication of RLC entities at different RAN nodes. The first solution may entail the node hosting PDCP signal sending the initial state of UL duplication to assisting node as detailed in conjunction with FIGS. 7-9. The second solution may involve an assisting node determine own initial state of UL duplication as detailed in conjunction with FIGS. 10-12.

Figure 7:
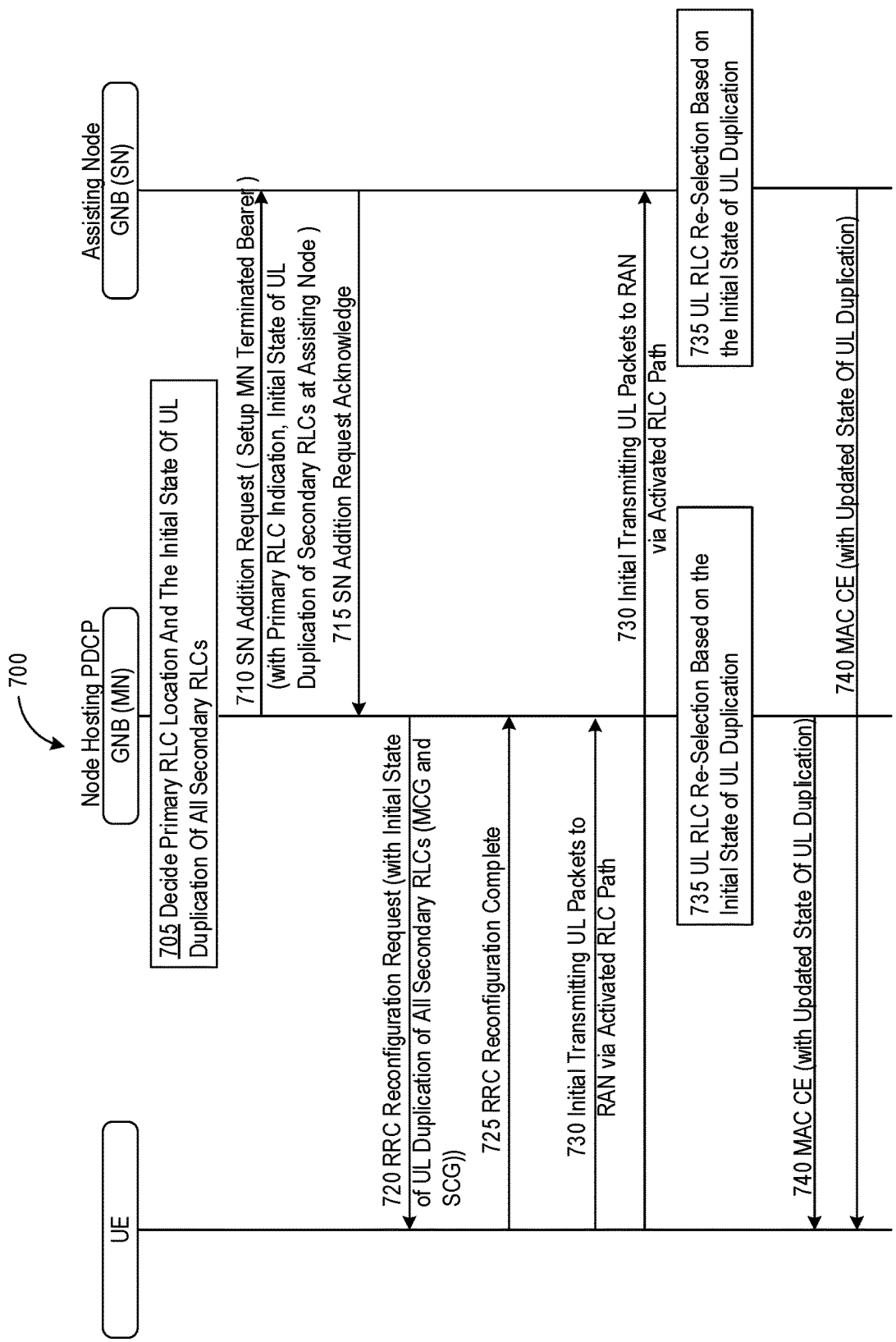
FIG. 7 illustrates a communication diagram of a data flow in a scenario of a node hosting a PDCP signal sending the initial state of uplink (UL) duplication to a MN terminated bearer as an assisting node.

A. Node Hosting a PDCP Signal Sending the Initial State of Uplink (UL) Duplication to a MN Terminated Bearer as an Assisting Node Referring now to FIG. 7, depicted is a communication diagram of a data flow 700 in a scenario of a node hosting a PDCP signal sending the initial state of uplink (UL) duplication to a MN terminated bearer as an assisting node. For the MN-terminated DRB to be setup under DC architecture as seen in data flow 700, illustrated is how the node (e.g., gNB MN 405) hosting PDCP (MN) signal send the initial state of UL duplication of RLC entities to assisting node (e.g., gNB SN 410).

At 705, for the MN terminated DRB to be setup, the MN node may determine the following for the DRB: the location of primary RLC entity (at MN or SN), and the initial state of UL duplication (RLC activated or deactivated) of all secondary RLC entities.

At 710, MN may send SN addition request message to the SN to setup DRB, including the following information for the MN terminated DRB: the information of the initial state of UL duplication of assisting node (which is used to indicate every secondary RLC entity at SN is activated or deactivated), and the information of the primary RLC indication (which is used to indicate whether the primary RLC entity is located at SN). The indication may be an explicit indication, such as true or false value, or an implicit indication, such as the number of secondary RLC entities at the assisting node or the number of secondary RLC entities at the host node combined with the number of total secondary RLC entities of the DRB. The assisting node can infer whether the primary RLC entity is located at the assisting node based on such number information.

At 715, after receiving SN addition request message sent by MN, for the DRB to be setup, if the information of the primary RLC indication indicates the primary RLC entity is not at SN, the SN may apply and store initial state of all own RLC entities indicated by the information of the initial state of UL duplication of assisting node. Otherwise, if the primary RLC entity is at SN, the SN may apply and store initial state of own RLC entities excluding the primary RLC entity referred to as the primary logical channel of SCG. The primary RLC entity is always activated for UL duplication. The SN may send SN addition response to the MN.

At 720, the MN may send RRC Reconfiguration message to UE, including initial state of UL duplication of all secondary RLCs in both MCG and SCG for the DRB. At 725, the UE may send RRC Reconfiguration complete message to RAN network. At 730, after the DRB has been established, the transmitting PDCP entity at UE side can duplicate the PDCP PDU and send the copy to each activated RLC entity indicated by the initial state of UL duplication configuration.

At 735, after the configuration, the RAN network can dynamically control the PDCP UL duplication during the transmission. At 740, the RAN node can send MAC CE to UE. The MAC CE can be used to dynamically control whether each of the configured secondary RLC entities for a DRB should be activated or deactivated (e.g., which of the RLC entities shall be used for UL duplicate transmission). The primary RLC entity cannot be deactivated. The UE applies the received MAC CE commands regardless of the origin UL duplication state.

Figure 8:
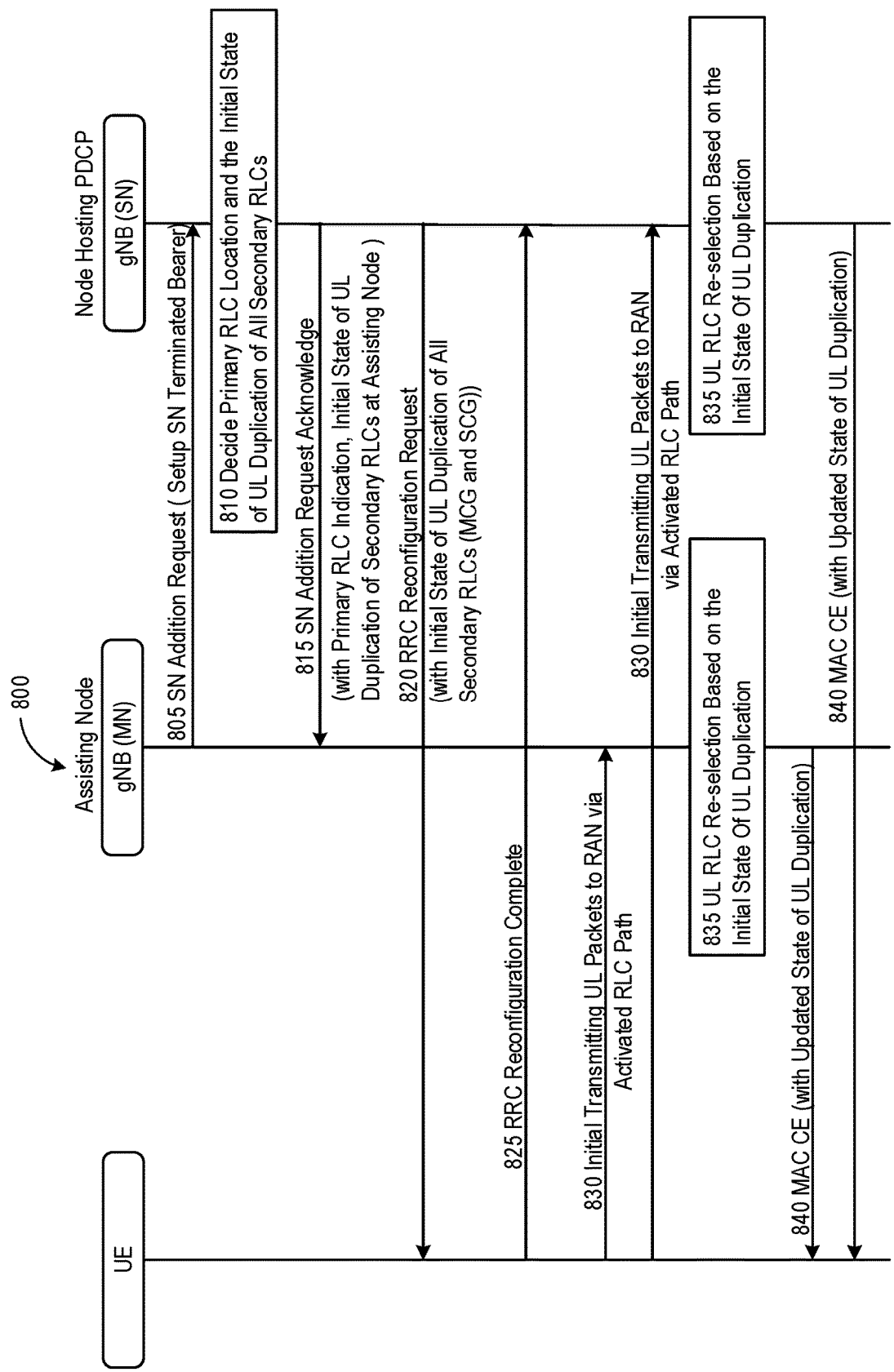
FIG. 8 illustrates a communication diagram of a data flow in a scenario of a node hosting a PDCP signal sending the initial state of UL duplication to a SN terminated split bearer as an assisting node.

B. Node Hosting PDCP Signal Sending the Initial State of UL Duplication to a SN Terminated Split Bearer as an Assisting Node Referring now to FIG. 8, depicted is a communication diagram of a data flow 800 in a scenario of a node hosting a PDCP signal sending the initial state of UL duplication to a SN terminated split bearer as an assisting node. At 805, the MN node send SN addition request message to the SN. At 810, for the SN terminated DRB to be setup, the SN may determine the following for the DRB: the location of primary RLC entity (at MN or SN), and the initial state of UL duplication (RLC activated or deactivated) of all secondary RLC entities of the DRB.

At 815, the SN may send SN addition response message to the MN, including the following information for the SN terminated DRB: the information of the initial state of UL duplication of assisting node (which is used to indicate every secondary RLC entity at MN is activated or deactivated), and the information of the primary RLC indication (which is used to indicate whether the primary RLC entity is located at MN). The indication may be an explicit indication, such as true or false value, or an implicit indication, such as the number of secondary RLC entities at the assisting node or the number of secondary RLC entities at the host node combined with the number of total secondary RLC entities of the DRB. The assisting node can infer whether the primary RLC entity is located at the assisting node based on such number information.

After receiving SN addition response message sent by SN, for the DRB to be setup, if the information of the primary RLC indication indicates the primary RLC entity is not at MN, the MN may apply and store initial state of all own RLC entities indicated by the information of the initial state of UL duplication of assisting node. Otherwise, if the primary RLC entity is at MN, the MN may apply and store initial state of own RLC entities excluding the primary RLC entity referred to as the primary logical channel of MCG. The primary RLC entity is always activated for UL duplication.

At 820, the SN may send RRC Reconfiguration message to UE, including initial state of UL duplication of all secondary RLCs in both MCG and SCG for the DRB. At 825, the UE may send RRC Reconfiguration complete message to RAN network. At 830, after the DRB has been established, the transmitting PDCP entity at UE side can duplicate the PDCP PDU and submit the copy to each activated RLC entity indicated by the initial state of UL duplication configuration. At 835, after the configuration, the RAN network can dynamically control the PDCP UL duplication during the transmission.

At 840, the RAN node can send MAC CE to UE. The MAC CE can be used to dynamically control whether each of the configured secondary RLC entities for a DRB should be activated or deactivated (e.g., which of the RLC entities shall be used for UL duplicate transmission). The primary RLC entity cannot be deactivated. The UE may apply the received MAC CE commands regardless of the origin UL duplication state.

Figure 9:
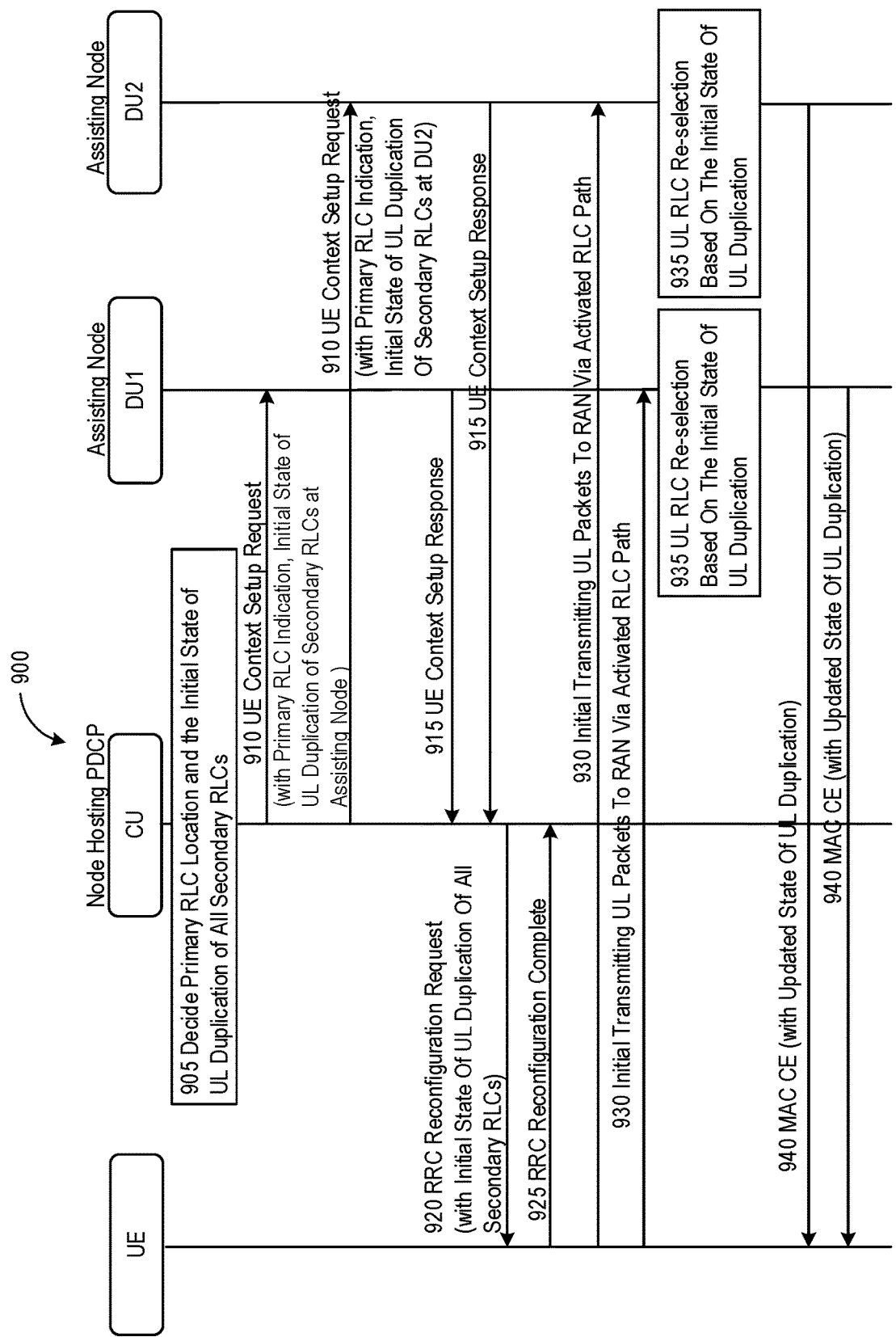
FIG. 9 illustrates a communication diagram of a data flow in a scenario of a node hosting a PDCP signal sending the initial state of UL duplication to CU-DU split entities as an assisting nodes.

C. Node Hosting PDCP Signal Sending the Initial State of UL Duplication to CU-DU Split Entities as an Assisting Nodes Referring now to FIG. 9, depicted is a communication diagram of a data flow 900 in a scenario of a node hosting a PDCP signal sending the initial state of UL duplication to CU-DU split entities as an assisting node. At 905, for the DRB to be setup at more than one DUs, the CU may determine the following for the DRB: the location of primary RLC entity (which DU), and the initial state of UL duplication (RLC activated or deactivated) of all secondary RLC entities of the DRB.

At 910, the CU may send UE context setup message to the different DU to setup UE context of the DRB, including the following information for the DRB: the information of the initial state of UL duplication of assisting node (which is used to indicate every secondary RLC entity at this DU is activated or deactivated), and the information of the primary RLC indication (which is used to indicate whether the primary RLC entity is located at this DU). The indication may be an explicit indication, such as true or false value, or an implicit indication, such as the number of secondary RLC entities at the assisting node or the number of secondary RLC entities at the host node combined with the number of total secondary RLC entities of the DRB. The assisting node can infer whether the primary RLC entity is located at the assisting node based on such number information.

At 915, after receiving UE context setup message sent by CU, for the DRB to be setup, if the information of the primary RLC indication indicates the primary RLC entity is not at this DU, the DU may apply and store initial state of all own RLC entities indicated by the information of the initial state of UL duplication of assisting node. Otherwise, if the primary RLC entity is at this DU, the DU may apply and store initial state of own RLC entities excluding the primary RLC entity referred to as the primary logical channel. The primary RLC entity may be always activated for UL duplication. The DU may send UE context setup response to the CU.

At 920, the RAN node may send RRC Reconfiguration message to UE, including initial state of UL duplication of all secondary RLCs in DU1 and DU2 for the DRB. At 925, the UE send RRC Reconfiguration complete message to RAN network. At 930, after the DRB has been established, the transmitting PDCP entity at UE side can duplicate the PDCP PDU and submit the copy to each activated RLC entity indicated by the initial state of UL duplication configuration.

At 935, after the configuration, the RAN network can dynamically control the PDCP UL duplication during the transmission. At 940, the RAN node can send MAC CE to UE. The MAC CE can be used to dynamically control whether each of the configured secondary RLC entities for a DRB should be activated or deactivated (e.g., which of the RLC entities shall be used for UL duplicate transmission). The primary RLC entity cannot be deactivated. The UE may apply the received MAC CE commands regardless of the origin UL duplication state.

Figure 10:
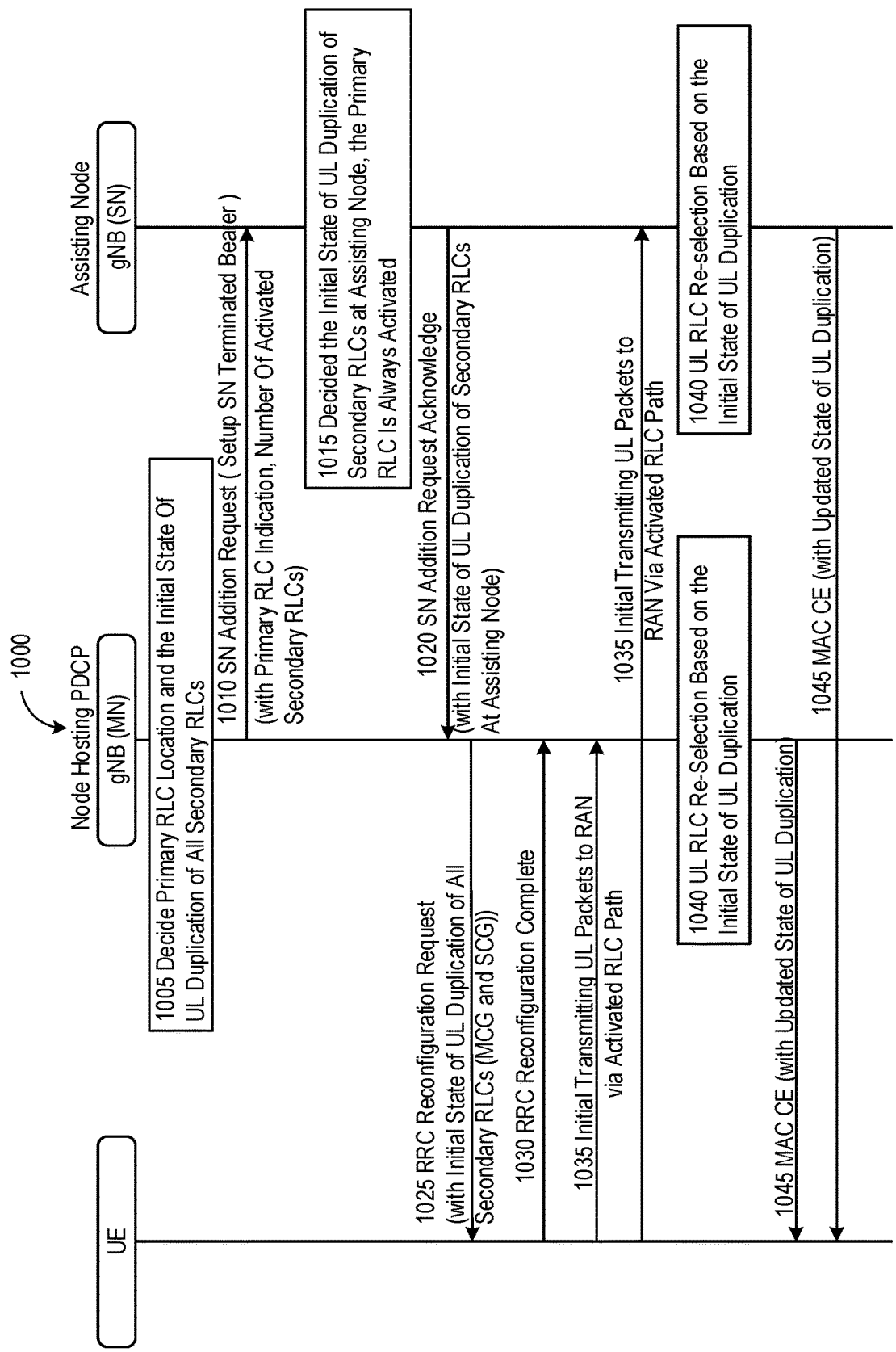
FIG. 10 illustrates a communication diagram of a data flow in a scenario of an assisting node determining the initial state of UL duplication with a MN terminated bearer.

D. Assisting Node Determining the Initial State of UL Duplication With a MN Terminated Bearer Referring now to FIG. 10, depicted is a communication diagram of a data flow 1000 in a scenario of an assisting node determining the initial state of UL duplication with a MN terminated bearer. At 1005, for the MN terminated DRB to be setup, the MN node may determine the following for the DRB: the location of primary RLC entity (at MN or SN), and the initial state of UL duplication (RLC activated or deactivated) of secondary RLC entities of MN.

At 1010, the MN may send SN addition request message to the SN to setup DRB, including the following information for the MN terminated DRB: the information of the number of activated secondary RLCs of assisting node (which is used to indicate how may secondary RLC entities shall be activated for UL duplication at SN), and the information of the primary RLC indication (which is used to indicate whether the primary RLC entity is located at SN). The indication may be an explicit indication, such as true or false value, or an implicit indication, such as the number of secondary RLC entities at the assisting node or the number of secondary RLC entities at the host node combined with the number of total secondary RLC entities of the DRB. The assisting node can infer whether the primary RLC entity is located at the assisting node based on such number information. It should be noted that if the information of the number of activated secondary RLCs of assisting node is absent, the assisting node may determine how may secondary RLCs of assisting node need to activated for UL duplication. For example, when the minimum number of activation is zero, the maximum number of activation may be the number of the secondary RLC entities at assisting node.

At 1015, after receiving SN addition request message sent by MN, for the DRB to be setup, the SN may take the information of the primary RLC indication and the information of the number of activated secondary RLCs of assisting node into account to determine the initial state of each of RLC entity at SN (e.g., either activated or deactivated). The primary RLC entity may always be configured as activated for UL duplication.

At 1020, the SN may send SN addition response to the MN, including the following information for the MN terminated DRB: the information of the initial state of UL duplication of assisting node (which is used to indicate every secondary RLC entity at SN is activated or deactivated). At 1025, the MN may send RRC Reconfiguration message to UE, including initial state of UL duplication of all secondary RLCs in both MCG and SCG for the DRB. At 1030, the UE may send RRC Reconfiguration complete message to RAN network.

At 1035, after the DRB has been established, the transmitting PDCP entity at UE side can duplicate the PDCP PDU and submit the copy to each activated RLC entity indicated by the initial state of UL duplication configuration. At 1040, after the configuration, the RAN network may dynamically control the PDCP UL duplication during the transmission.

At 1045, the RAN node can send MAC CE to UE. The MAC CE can be used to dynamically control whether each of the configured secondary RLC entities for a DRB should be activated or deactivated (e.g., which of the RLC entities shall be used for UL duplicate transmission). Primary RLC entity may not be deactivated. The UE may apply the received MAC CE commands regardless of the origin UL duplication state.

Figure 11:
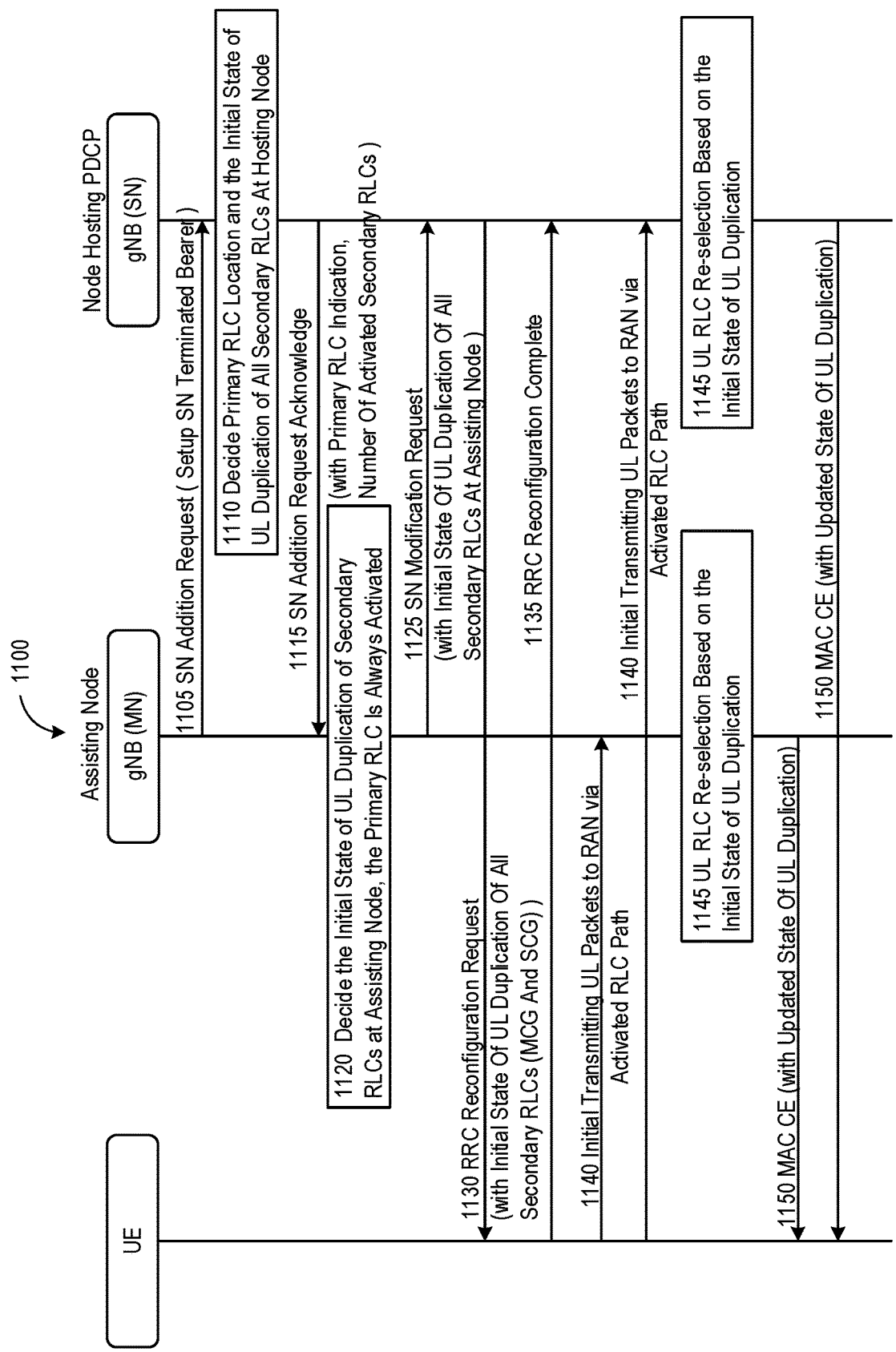
FIG. 11 illustrates a communication diagram of a data flow in a scenario of an assisting node determining the initial state of UL duplication with a SN terminated bearer.

E. Assisting Node Determining the Initial State of UL Duplication with a SN Terminated Bearer Referring now to FIG. 11, depicted is a communication diagram of a data flow 1100 in a scenario of an assisting node determining the initial state of UL duplication with a SN terminated bearer. At 1105, the MN node send SN addition request message to the SN. At 1110, for the SN terminated DRB to be setup, the SN may determine the following for the DRB: the location of primary RLC entity (at MN or SN), and the initial state of UL duplication (RLC activated or deactivated) of secondary RLC entities at SN.

At 1115, the SN may send SN addition response message to the MN, including the following information for the SN terminated DRB: the information of the number of activated secondary RLCs of assisting node (which is used to indicate how may secondary RLC entities shall be activated for UL duplication at MN), and the information of the primary RLC indication (which is used to indicate whether the primary RLC entity is located at MN). The indication may be an explicit indication, such as true or false value, or an implicit indication, such as the number of secondary RLC entities at the assisting node or the number of secondary RLC entities at the host node combined with the number of total secondary RLC entities of the DRB. The assisting node can infer whether the primary RLC entity is located at the assisting node based on such number information. It should be noted that if the information of the number of activated secondary RLCs of assisting node is absent, the assisting node may determine how may secondary RLCs of assisting node need to activated for UL duplication. For example, when the minimum number of activation is zero, the maximum number of activation may be the number of the secondary RLC entities at assisting node.

At 1120, after receiving SN addition response message sent by SN, for the DRB to be setup, the SN may take the information of the primary RLC indication and the information of the number of activated secondary RLCs of assisting node into account to determine the initial state of each of RLC entity at MN (e.g., either activated or deactivated). The primary RLC entity may always be configured as activated for UL duplication.

At 1125, the MN may send SN modification request to the SN, including the following information for the SN terminated DRB: the information of the initial state of UL duplication of assisting node (which is used to indicate every secondary RLC entity at MN is activated or deactivated). At 1130, the SN may send RRC Reconfiguration message to UE, including initial state of UL duplication of all secondary RLCs in both MCG and SCG for the DRB. At 1135, the UE may send RRC Reconfiguration complete message to RAN network. At 1140, after the DRB has been established, the transmitting PDCP entity at UE side can duplicate the PDCP PDU and submit the copy to each activated RLC entity indicated by the initial state of UL duplication configuration.

At 1145, after the configuration, the RAN network can dynamically control the PDCP UL duplication during the transmission. At 1150, the RAN node can send MAC CE to UE. The MAC CE can be used to dynamically control whether each of the configured secondary RLC entities for a DRB should be activated or deactivated (e.g., which of the RLC entities shall be used for UL duplicate transmission). Primary RLC entity cannot be deactivated. The UE may apply the received MAC CE commands regardless of the origin UL duplication state.

Figure 12:
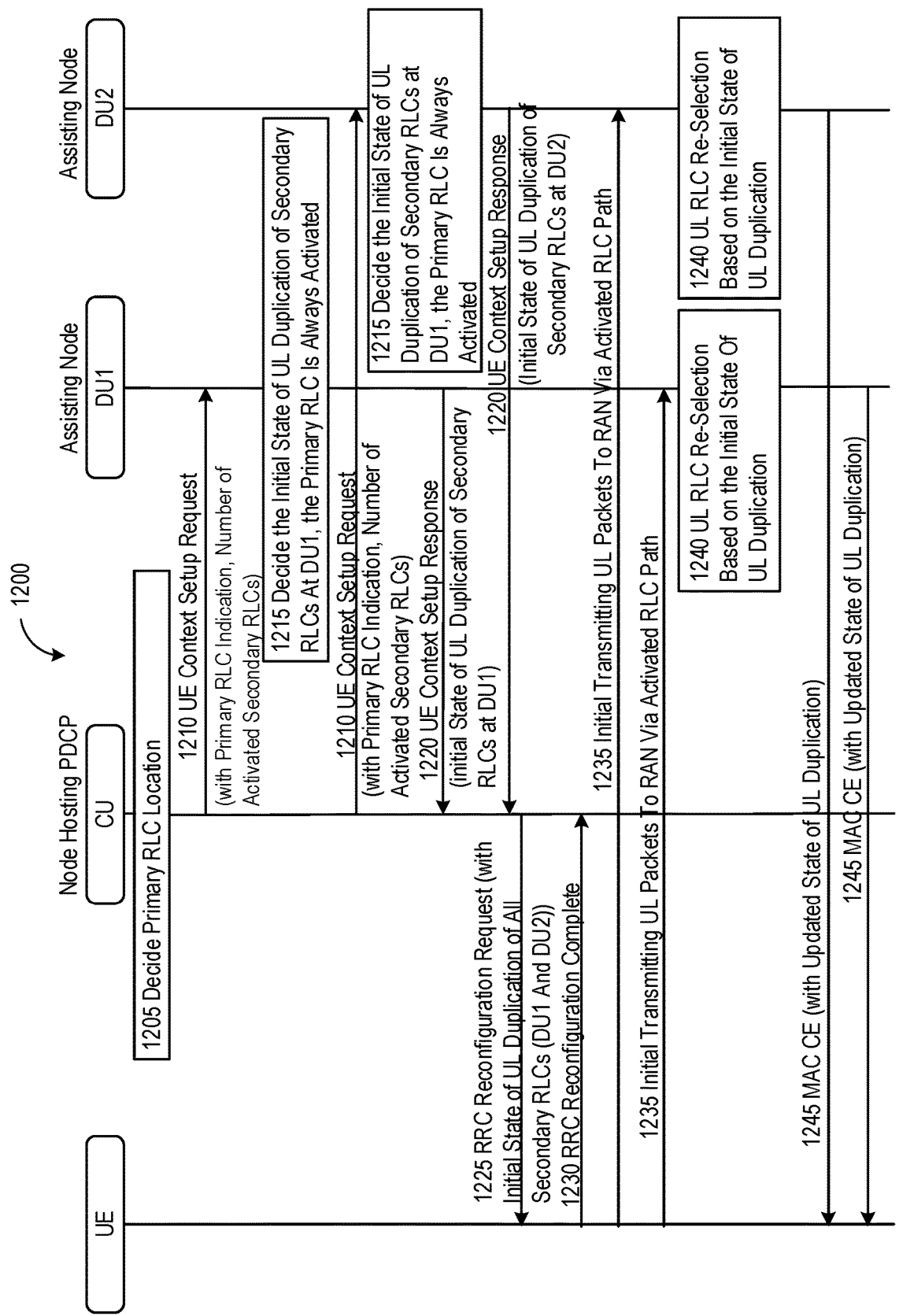
FIG. 12 illustrates a communication diagram of a data flow in a scenario of an assisting node determining the initial state of UL duplication with CU-DU split entities.

F. Assisting Node Determining the Initial State of UL Duplication With CU-DU Split Entities Referring now to FIG. 12, depicted is a communication diagram of a data flow 1200 in a scenario of an assisting node determining the initial state of UL duplication with CU-DU split entities. At 1205, for the DRB to be setup at more than one DUs, the CU may determine the following for the DRB: the location of primary RLC entity (which DU).

At 1210, the CU may send UE context setup message to the different DU to setup UE context of the DRB, including the following information for the DRB: the information of the number of activated secondary RLCs of assisting node (which is used to indicate how may secondary RLC entities shall be activated for UL duplication at this DU), and the information of the primary RLC indication (which is used to indicate whether the primary RLC entity is located at this DU). The indication may be an explicit indication, such as true or false value, or an implicit indication, such as the number of secondary RLC entities at the assisting node or the number of secondary RLC entities at the host node combined with the number of total secondary RLC entities of the DRB. The assisting node can infer whether the primary RLC entity is located at the assisting node based on such number information. It should be noted that if the information of the number of activated secondary RLCs of assisting node is absent, the assisting node may determine how may secondary RLCs of assisting node need to activated for UL duplication. For example, the minimum number of activation is zero, the maximum number of activation may be the number of the secondary RLC entities at assisting node.

At 1215, after receiving UE context setup message sent by CU, for the DRB to be setup, for the DRB to be setup, the DU may take the information of the primary RLC indication and the information of the number of activated secondary RLCs of assisting node into account to determine the initial state of each of RLC entity at DU (e.g., either activated or deactivated). The primary RLC entity may be always configured as activated for UL duplication.

At 1220, the DU may send UE context setup response to the CU. At 1225, the RAN node may send RRC Reconfiguration message to UE, including initial state of UL duplication of all secondary RLCs in DU1 and DU2 for the DRB. At 1230, the UE may send RRC Reconfiguration complete message to RAN network. At 1235, after the DRB has been established, the transmitting PDCP entity at UE side can duplicate the PDCP PDU and submit the copy to each activated RLC entity indicated by the initial state of UL duplication configuration.

At 1240, After the configuration, the RAN network can dynamically control the PDCP UL duplication during the transmission. At 1245, the RAN node can send MAC CE to UE. The MAC CE can be used to dynamically control whether each of the configured secondary RLC entities for a DRB should be activated or deactivated (e.g., which of the RLC entities shall be used for UL duplicate transmission). The primary RLC entity cannot be deactivated. The UE may apply the received MAC CE commands regardless of the origin UL duplication state.

G. Process for Uplink Packet Duplication Transmission

Figure 13:
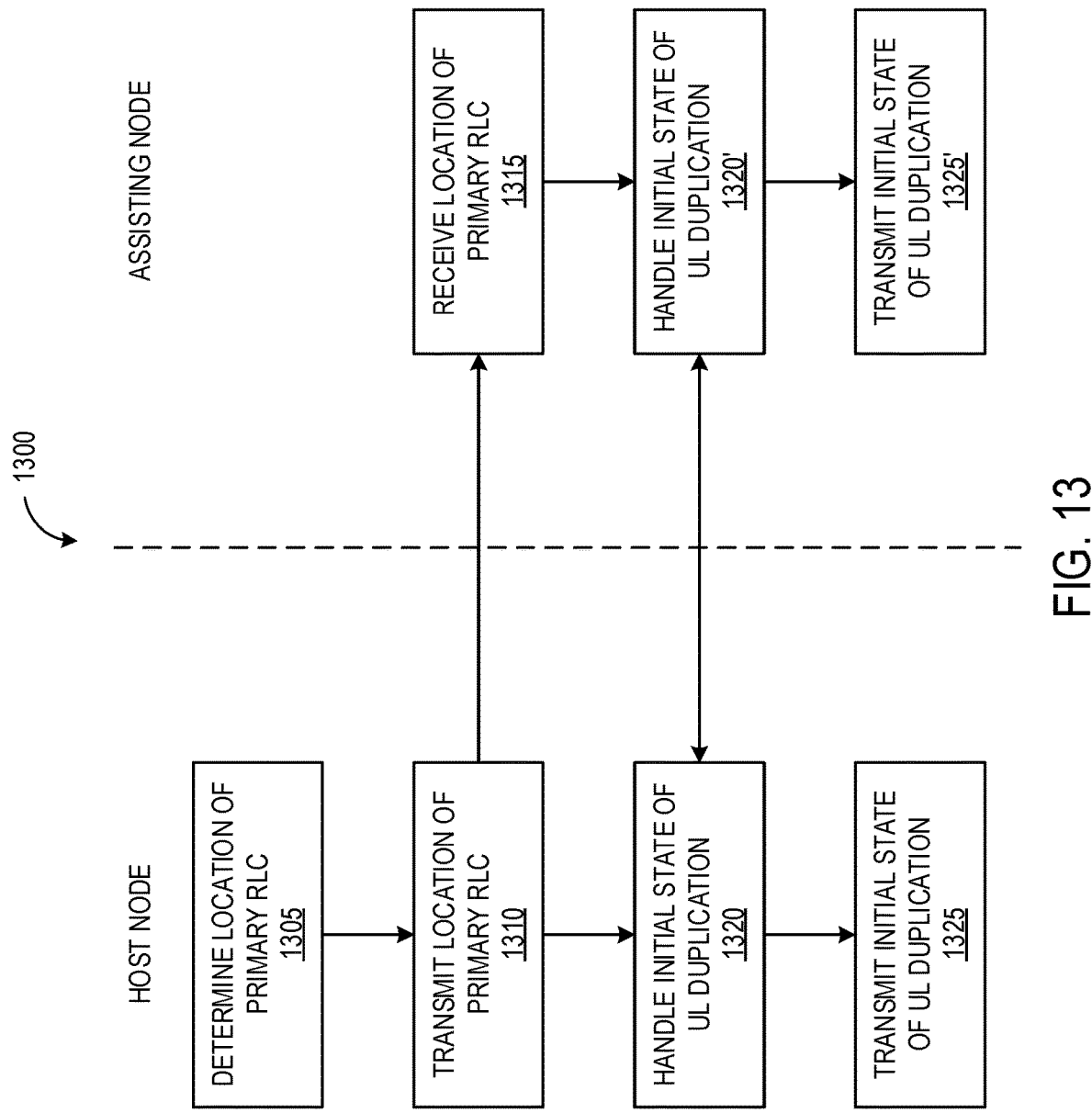
FIG. 13 illustrates a flow diagram of a method of uplink packet duplication transmissions.

Referring now to FIG. 13, depicted is a flow diagram of a process or a method 1300 of uplink packet duplication transmissions. The method 1300 may be implemented or performed by any of the components described herein in conjunction with FIGS. 1-12. In brief overview, a host radio access network (RAN) node may determine a location of a primary radio link control (RLC) entity (1305). The host RAN node may transmit the location of the primary RLC entity (1310). An assisting RAN node may receive the location of the primary RLC entity (1315). The host RAN node and the assisting RAN node may handle an initial state of uplink (UL) duplication (1320 and 1320'). The host RAN node and the assisting RAN node may transmit the initial state of UL duplication (1325 and 1325').

In further detail, a host radio access network (RAN) node may identify or determine a location of a primary radio link control (RLC) entity (1305). The host RAN node may store, maintain, or otherwise host a packet data convergence protocol (PDCP) entity (e.g., PDCP entity 305). The primary RLC entity (e.g., primary RLC entity 310A) may be established and maintained from a radio resource control (RRC) layer. The location of primary RLC entity may be referenced using an address in accordance with RLC. The PDCP entity may be established and maintained by the host RAN node on the PDCP protocol layer.

The host RAN node may send, provide, or transmit the location of the primary RLC entity (1310). The location of the primary RLC entity may be transmitted to an assisting RAN node. In some embodiments, the hos RAN node may transmit the location of the primary RLC entity included in a sending node addition request (e.g., 710, 805, 1010, and 1105). In some embodiments, the host RAN node may transmit the location of the primary RLC entity included in a UE context setup request (e.g., 910 and 1210). The assisting RAN node may in turn retrieve, identify, or otherwise receive the location of the primary RLC entity (1315). In some embodiments, the assisting RAN node may receive the sending node addition request (e.g., 710, 805, 1010, and 1105) including the location of primary RLC entity from the host RAN node. In some embodiments, the assisting RAN node may transmit the location of the primary RLC entity included in a UE context setup request (e.g., 910 and 1210). In some embodiments, the host RAN node may include, be, or correspond to a master node (MN) and the assisting RAN node may include, be, or correspond to a secondary node (SN). Vice-versa, in some embodiments, the host RAN node may include, be, or correspond to a secondary node (SN) and the assisting RAN node may include, be, or correspond to a master node (MN). In some embodiments, the host RAN node may include, be, or correspond to a central unit (CU) and the assisting RAN node may include, be, or correspond to a distributed unit (DU).

The host RAN node and the assisting RAN node may handle an initial state of uplink (UL) duplication (1320 and 1320'). In some embodiments, the host RAN node may identify or determine the initial state of UL duplication of one or more secondary nodes at the assisting RAN node. In some embodiments, the host RAN node may identify or determine the initial state of UL duplication of at least one secondary RLC entity (e.g., secondary RLC 310B) at the assisting RAN node. In some embodiments, the host RAN node may identify or determine the initial state of UL duplication of all secondary includes including the secondary RLC entity at the assisting RAN node. In some embodiments, upon determination, the host RAN node may transmit the initial state of the UL duplication to the assisting RAN node.

In turn, the assisting RAN node may retrieve, identify, or receive the initial state of UL duplication of the one or more secondary nodes at the assisting node from the host RAN node. In some embodiments, the assisting RAN node may identify or determine the initial state of UL duplication of at least one secondary RLC entity (e.g., secondary RLC 310B) at the assisting RAN node. In some embodiments, the assisting RAN node may retrieve, identify, or receive the initial state of UL duplication of all secondary includes including the secondary RLC entity at the assisting RAN node.

In some embodiments, the host RAN node may identify or determine the initial state of UL duplication of at least one secondary RLC entity at another assisting RAN node. The other assisting RAN node may include, for example, another distributed unit (e.g., DU2). In some embodiments, the host RAN node may send, provide, or transmit the initial state of UL duplication of at least one secondary RLC entity at the other assisting RAN node. The other assisting RAN node may perform the same functionary as the first assisting RAN node.

Upon receipt of the initial state of UL duplication from the host RAN node, the assisting RAN node may determine whether the location of the primary RLC entity is at the assisting RAN node. When the location of the primary RLC entity is at not at the assisting RAN node, the assisting RAN node may maintain or store the initial state of UL duplication of at least one secondary RLC entity at the assisting node. On the other and, when the location of the primary RLC entity is at the assisting RAN node, the assisting RAN node may maintain or store the initial state of UL duplication of at least one secondary RLC entity at the assisting RAN node. The storage of the initial state of UL duplication may be except that of the primary RLC entity.

In some embodiments, the host RAN node may identify or determine an initial state of UL duplication of at least one secondary RLC entity at the host RAN node itself. In some embodiments, the host RAN node may send, provide, or transmit the initial state of UL duplication at the host RAN node to the assisting RAN node. The assisting RAN node may in turn retrieve, identify, or receive the initial state of UL duplication at the host RAN node from the host RAN node. In some embodiments, the host RAN node may identify, calculate, or determine a number secondary RLC entities to be activated at the assisting RAN node. The host RAN node may send, provide, transmit the number of secondary RLC entities to the assisting RAN node. In some embodiments, the assisting RAN node may in turn retrieve, identify, or receive the number of secondary RLC entities to be activated from the host RAN node.

In some embodiments, the assisting node may identify or determine the initial state of UL duplication of at least one secondary RLC node at the assisting RAN node. The determination of the initial state of UL duplication may be in accordance with the location of the primary RLC entity and the number of secondary RLC entities to be activated at the assisting RAN node. In some embodiments, the assisting RAN node may send, provide, or transmit the determined initial state of UL duplication of at least one secondary RLC entity at the assisting RAN node to the host RAN node. The host RAN node may in turn retrieve, identify, or receive the initial state of UL duplications of at least one secondary RLC entity at the assisting RAN node from the assisting RAN node.

The host RAN node and the assisting RAN node may send, provide, or transmit the initial state of UL duplication (1325 and 1325'). In some embodiments, the host RAN node may send, provide, or transmit the initial state of UL duplication of the one or more RLC entities at the assisting node to a wireless communication device (e.g., UE 104). In some embodiments, the host RAN node may send, provide, or transmit the initial state of UL duplication of the one or more secondary RLC entities at the host RAN node to the wireless communication device (e.g., UE 104). The initial state of UL duplication at the assisting RAN node may transmitted directly or via the assisting node from the host RAN node to the wireless communication devices using a radio resource control (RRC) message (e.g., MAC-CE 740, 840, 940, 1045, 1150, and 1245). The initial state of UL duplication at the host RAN node may transmitted directly or via the assisting node from the host RAN node to the wireless communication devices using the RRC message (e.g., MAC-CE 740, 840, 940, 1045, 1150, 1245).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   determining, by a host radio access network (RAN) node hosting a packet data convergence protocol (PDCP) entity, a location of a primary radio link control (RLC) entity;
   transmitting, by the host RAN node to an assisting RAN node, the location of the primary RLC entity to indicate whether the primary RLC is at the assisting RAN node;
   determining, by the host RAN node, an initial state of uplink duplication of at least one secondary RLC entity at the assisting RAN node as one of RLC activated or deactivated; and
   transmitting, by the host RAN node to the assisting RAN node, the initial state of uplink duplication of the at least one secondary RLC entity at the assisting RAN node.

2. The method of claim 1, wherein the host RAN node comprises a master node (MN), and the assisting RAN node comprises a secondary node (SN).

3. The method of claim 1, wherein the host RAN node comprises a secondary node (SN), and the assisting RAN node comprises a master node (MN).

4. The method of claim 1, wherein the host RAN node comprises a centralized unit (CU), and the assisting RAN node comprises a distributed unit (DU).

5. A method, comprising:
   receiving, by an assisting radio access network (RAN) node, from a host RAN node hosting a packet data convergence protocol (PDCP) entity, a location of a primary radio link control (RLC) entity to indicate whether the primary RLC is at the assisting RAN node; and
   receiving, by the assisting RAN node from the host RAN node, an initial state of uplink duplication of at least one secondary RLC entity at the assisting RAN node as one of RLC activated or deactivated.

6. The method of claim 5, wherein the host RAN node comprises a master node (MN), and the assisting RAN node comprises a secondary node (SN).

7. The method of claim 5, wherein the host RAN node comprises a secondary node (SN), and the assisting RAN node comprises a master node (MN).

8. The method of claim 5, wherein the host RAN node comprises a centralized unit (CU), and the assisting RAN node comprises a distributed unit (DU).

9. A host radio access network (RAN) node hosting a packet data convergence protocol (PDCP) entity, comprising:
   at least one processor configured to:
      determine a location of a primary radio link control (RLC) entity;
      transmit, via a transmitter to an assisting RAN node, the location of the primary RLC entity to indicate whether the primary RLC is at the assisting RAN node;
      determine an initial state of uplink duplication of at least one secondary RLC entity at the assisting RAN node as one of RLC activated or deactivated; and
      transmit, via the transmitter to the assisting RAN node, the initial state of uplink duplication of the at least one secondary RLC entity at the assisting RAN node.

10. The host RAN node of claim 9, wherein the host RAN node comprises a master node (MN), and the assisting RAN node comprises a secondary node (SN).

11. The host RAN node of claim 9, wherein the host RAN node comprises a secondary node (SN), and the assisting RAN node comprises a master node (MN).

12. The host RAN node of claim 9, wherein the host RAN node comprises a centralized unit (CU), and the assisting RAN node comprises a distributed unit (DU).

13. An assisting radio access network (RAN) node, comprising:
   at least one processor configured to:
      receive, via a receiver from a host RAN node hosting a packet data convergence protocol (PDCP) entity, a location of a primary radio link control (RLC) entity to indicate whether the primary RLC is at the assisting RAN node; and
      receive, via the receiver from the host RAN node, an initial state of uplink duplication of at least one secondary RLC entity at the assisting RAN node as one of RLC activated or deactivated.

14. The assisting RAN node of claim 13, wherein the host RAN node comprises a master node (MN), and the assisting RAN node comprises a secondary node (SN).

15. The assisting RAN node of claim 13, wherein the host RAN node comprises a secondary node (SN), and the assisting RAN node comprises a master node (MN).

16. The assisting RAN node of claim 13, wherein the host RAN node comprises a centralized unit (CU), and the assisting RAN node comprises a distributed unit (DU).

* * * * *